M. VAN MARLE.
MEANS FOR FEEDING GOODS INTO AND REMOVING GOODS FROM ANNEALING AND OTHER FURNACES.
APPLICATION FILED JULY 8, 1920.

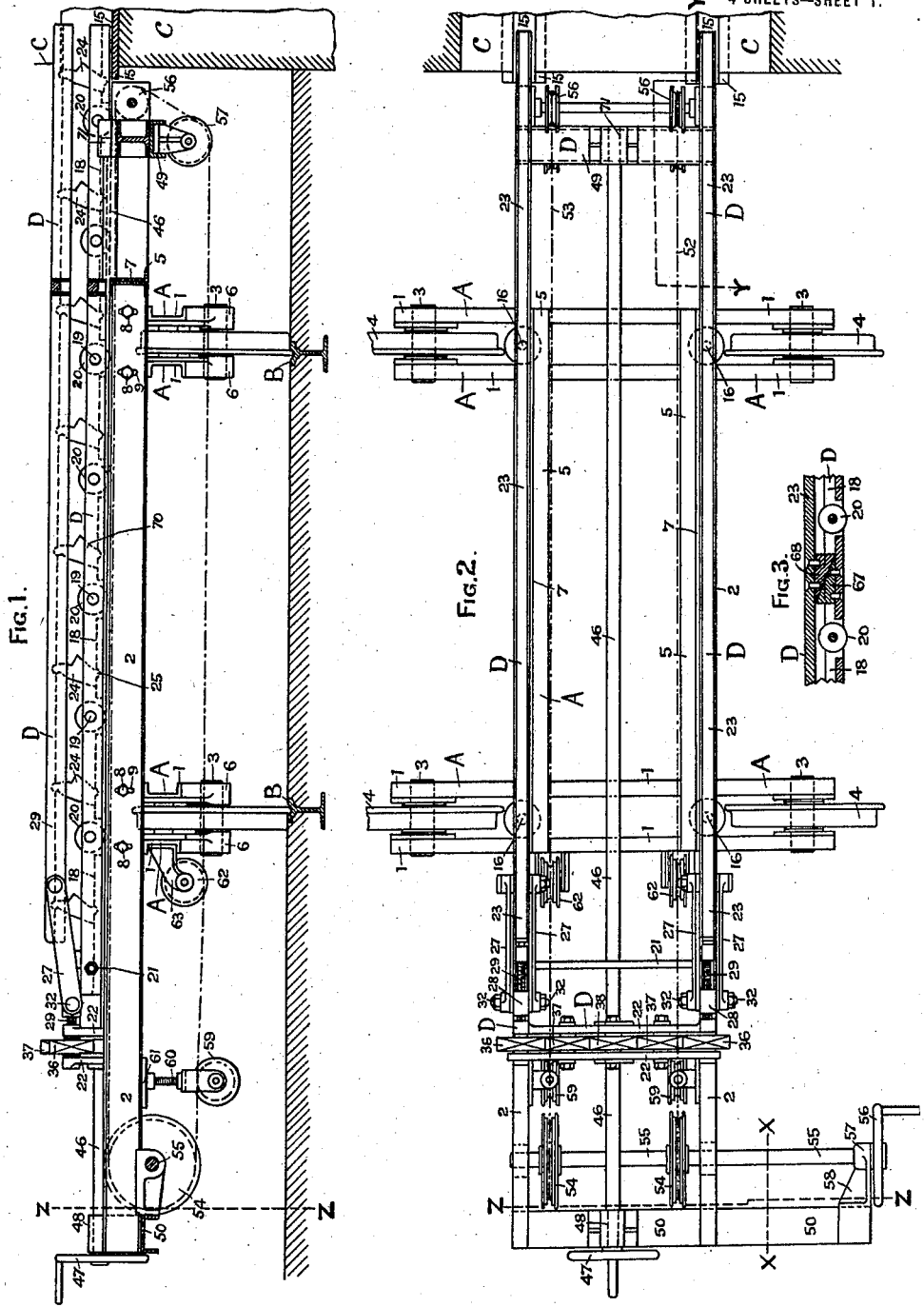

1,402,551.

Patented Jan. 3, 1922.
4 SHEETS—SHEET 2.

INVENTOR:
Martin Van Marle
BY Wm Wallace White
ATT'Y

M. VAN MARLE.
MEANS FOR FEEDING GOODS INTO AND REMOVING GOODS FROM ANNEALING AND OTHER FURNACES.
APPLICATION FILED JULY 8, 1920.
1,402,551. Patented Jan. 3, 1922.
4 SHEETS—SHEET 3.
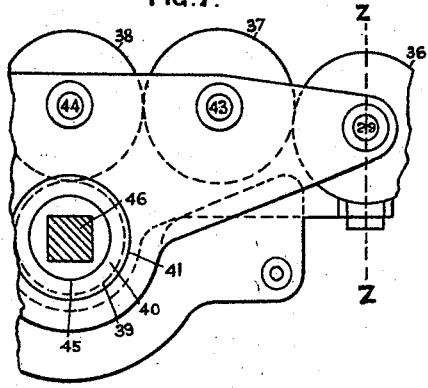
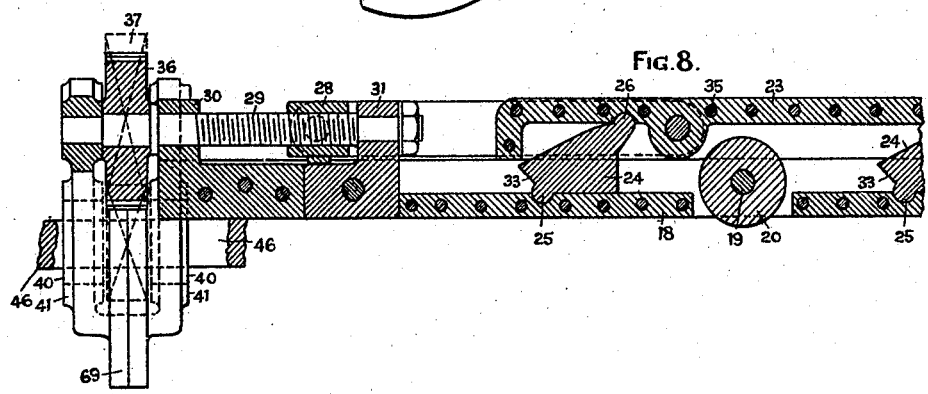
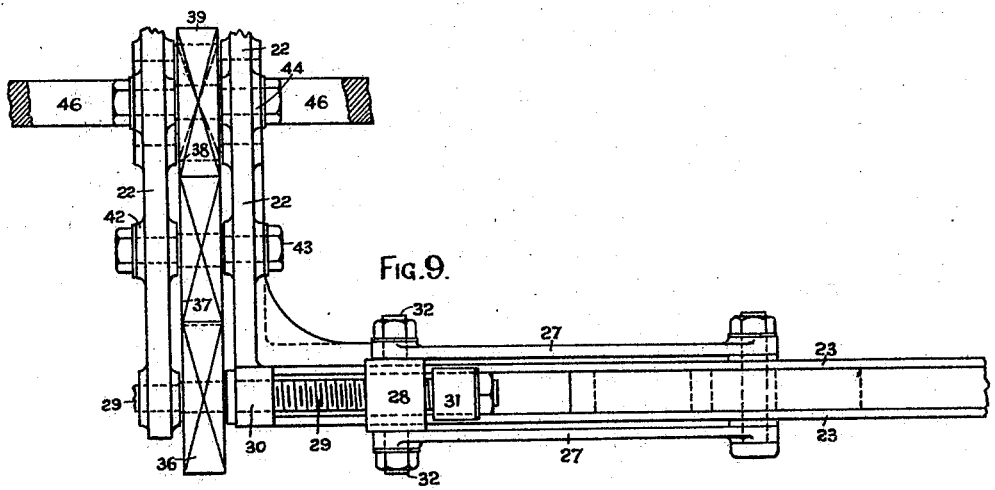

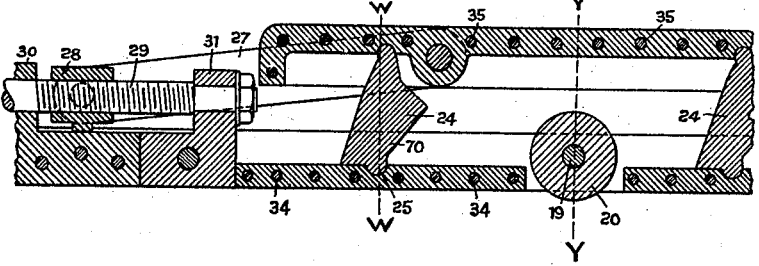
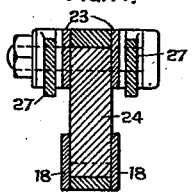 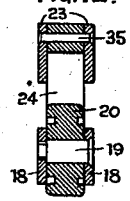
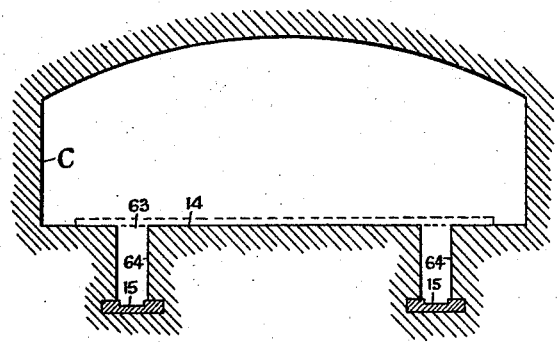
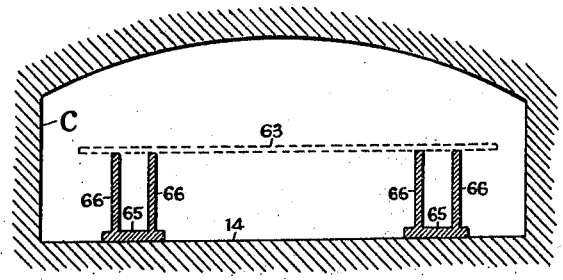

UNITED STATES PATENT OFFICE.

MARTIN VAN MARLE, OF LOWER GORNAL, ENGLAND.

MEANS FOR FEEDING GOODS INTO AND REMOVING GOODS FROM ANNEALING AND OTHER FURNACES.

1,402,551. Specification of Letters Patent. Patented Jan. 3, 1922.

Application filed July 8, 1920. Serial No. 394,781.

*To all whom it may concern:*

Be it known that MARTIN VAN MARLE, a subject of His Majesty the King of Great Britain and Ireland, residing at Dibdale Works, Lower Gornal, in the county of Stafford, England, has invented new and useful Improvements in or Connected with Means for Feeding Goods into and Removing Goods from Annealing and other Furnaces, (for which he has obtained a patent in Great Britain, No. 116,949, dated February 19, 1919,) of which the following is a specification.

This invention comprises improvements in or connected with means for feeding metal goods or other goods into annealing and other furnaces and for removing such goods from said furnaces. My invention is of that type which comprises a goods carrying carriage adapted for longitudinal movement and arranged so as to carry the goods bodily into the furnace and to lower and deposit them on to the furnace bottom or on to rails or supports thereon and then to return out of the furnace, said goods carriage being carried by a traveller adapted to travel along rails or the like outside the front of a furnace or a battery of furnaces so that the same feeding and charging device will serve for any of the furnaces. The goods carriage is so arranged that it can also be used for removing goods from the furnace as in this case said goods carriage is caused to travel longitudinally into the furnace under the goods and then to rise and lift the goods bodily off the furnace floor or supports and to travel backwardly with the goods out of the furnace.

According to this invention the goods carriage which is adapted for longitudinal movement along rails of a frame fixed to the traveller, and also along rails on the furnace bottom is furnished with longitudinal goods carrying bars combined with means for raising and lowering such bars on the carriage, the arrangement being such that the goods carriage with its longitudinal bars and the goods thereon in the raised position can be moved longitudinally into the furnace and then the longitudinal bars of the carriage are lowered on the carriage clear of the goods and the goods carriage is then travelled backwardly out of the furnace. Similarly when removing goods from the furnace the goods carriage with its longitudinal bars in their lowest position is propelled along the rails of the frame into the furnace and along the rails of the same under the goods therein and then the longitudinal bars of the carriage are raised so as to lift the goods bodily off the bottom of the furnace, or off the supports on which the goods were resting, and then the goods carriage with the goods is moved back out of the furnace and the traveller is travelled along to the place where the goods are to be deposited.

The preferred arrangement of carrying out this invention is illustrated by the accompanying drawings of which:—

Fig. 1 is a part sectional side elevation on lines X X and Y Y of Fig. 2 of a goods carriage and its traveller constructed and arranged in accordance with this invention, this view also showing in longitudinal sectional elevation a portion of the furnace into which the goods are to be deposited by this invention, and also showing a portion of the floor outside the furnace with the rails along which the traveller runs to serve a battery of furnaces;

Fig. 2 is a plan of the arrangement shown in Fig. 1 with part of the furnace in section;

Fig. 3 is a longitudinal sectional elevation of part of the goods carriage and illustrating a slight modification of this invention;

Fig. 7 is an end elevation on a larger scale than Figures 1 and 2 of rather more than one half of the goods carriage;

Fig. 8 is a longitudinal sectional elevation of portions of the goods carriage taken on line Z Z of Fig. 7;

Fig. 9 is a plan of the same;

Fig. 10 is also a longitudinal sectional elevation of a portion of the goods carriage but showing one of the carrying bars in their raised position whereas in Figs. 8 and 9 the carrier bar is shown in its lowest position;

Fig. 11 is a cross sectional elevation of the same taken on line W W of Fig. 10;

Fig. 12 is also a cross sectional elevation of the same taken on line V V of Fig. 10;

Fig. 13 is a cross sectional view of the furnace showing the rails along which the goods carriage runs;

Fig. 14 is also a cross sectional elevation of the furnace showing a modified arrangement of the rails on the furnace bottom.

A is the traveller adapted to travel along the rails B which are laid parallel with a battery of annealing or other furnaces of which a portion of one furnace is shown in Figs. 1 and 2 and is marked C, the cross sectional shape of the floor 14 of the furnace and the rails being shown separately in Fig. 13.

Figure 4:
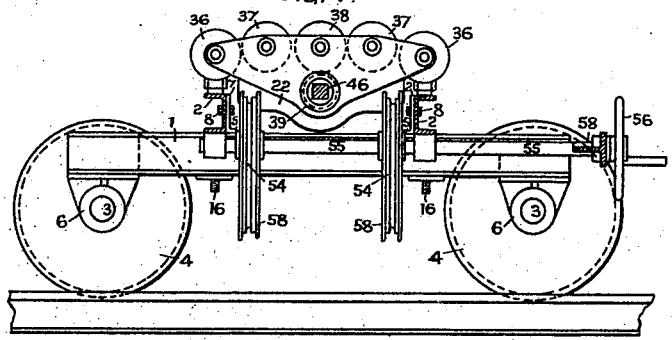
Fig. 4 is a cross sectional elevation of the traveller and goods carriage Figs. 1 and 2 taken on the line Z Z of Figs. 1 and 2.
Figure 5:
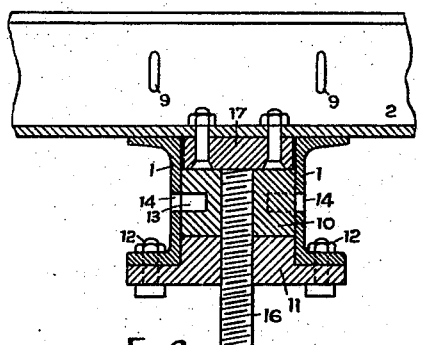
Fig. 5 is a cross sectional elevation showing parts of the traveller and goods carriage and one of the levelling screws for the latter.
Figure 6:
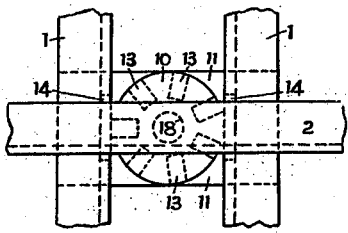
Fig. 6 is a plan of the same.

D is the goods carriage which is arranged to travel to and fro along the horizontal cross rails or girders 2 of the traveller A and is adapted to also travel along the rails 15 in the furnace C to deposit the goods in the furnace as aforesaid or to pick them up and carry them out of the furnace. The traveller A comprises two pairs of parallel girders marked 1 fixed at a short distance apart side by side and at their ends fitted with axle bearings 6 for the axles 3 of the flanged wheels 4 which are adapted to travel along the floor rails B outside the furnace. Fixed crosswise on the girders 1 is the frame along which the goods carriage D travels. This frame is preferably formed of two horizontal angle section bars 5 which are laid on the top of the channel bars 1 and are riveted thereto so as to fix them at the correct distance apart, and fixed to the sides of the vertical flanges 7 of these two angle section bars 5 there are two channel section horizontal girders 2 which in their lowest position rest on the girders 1 of the traveller and are bolted to the vertical side flanges 7 of the angle section bars 5 by bolts 8 in slotted holes 9 of the girders 2 so as to permit of these girders 2 being set up or down slightly, that is at parts where they cross the girders 1 of the traveller so that the girders 2 forming the rails as aforesaid can be set exactly level. This is preferably accomplished by each of the girders 2 being provided with two vertical levelling screws 16 shown in detail in Figs. 5, and 6, the heads 17 of these screws 16 being riveted to the underside of the girders 2 and working through nuts 10 arranged between the channel girders 1 and resting on the bottom blocks 11 which by bolts 12 or by rivets are fixed to the lower flanges of these girders 1. The nuts 10 are made with radial holes 13 so that the nuts can be turned by an instrument inserted through slotted holes 14 in the channel girders 1, and thus the rails 2 can be set exactly level and rigidly secured in that position by tightening up the nuts on the bolts 8 which secure them to the angle section bars 7.

The goods carriage D is preferably made of about the same length as is the furnace C with which it is to be used. The said goods carriage comprises two inverted channel shaped longitudinal bottom side bars 18 arranged parallel with one another and fixed at the proper distance apart as hereinafter described, and mounted on axles 19 of wheels 20 which are adapted to travel along the top sides of the beams 2 of the goods carriage and also to travel along the corresponding rails 15 in the bottom of the furnace. These bottom side bars 18 of the carriage are fixed at the proper distance apart by means of the cross stay 21 and the cast iron end bracket 22 which latter at the sides is bolted to the side bars 18 and carries the gearing as hereinafter described for raising and lowering the longitudinally disposed goods carrying bars 23 which are arranged parallel with and on the top of the lower side bars 18. Any suitable mechanism may be employed for raising and lowering the goods carrying bars 23 from the lower side bars 18 such for instance as the arrangement of toggle links 24 which are situated within the channel side bars 18 and the inverted channel carrying bars 23 and fit between the sides of the same, the lower ends 25 of the toggles 24 being jointed as by engaging in notches in the bottoms of the channel bars 18 of the carriage, and the upper ends 26 of the toggles are jointed to the carrying bars 23 by engaging in notches formed therein as shown in Figs. 8 and 10. The carrying bars 23 are connected by connecting links 27 to side pins 32 of nuts 28 working on horizontal screws 29 mounted in bearings 30, 31 fixed on the bottom bars 18. In their normal positions the toggle links 24 are inclined towards the front of the carriage as in Figure 8 and their flat parts 70 rest on the bottom of the channel side bars 18 on the top of which the sides of the carrying bars 23 then rest as in Fig. 8. To raise the carrying bars 23 the screws 29 have to be turned in the direction to travel the nuts 28 backwardly along the screws 29 and this longitudinal backward movement is transmitted through the links 27 to the carrying bars 23 which thus cause the toggle links 24 to turn on their jointed lower and upper ends and to raise the carrying bars 23 until the toggle links 24 occupy vertical positions as in Figs. 10, 11, 12, where they are maintained by the nuts 28 on the screws 29 and by the stop ends 33 of the toggles 24 resting on the bottom of the channels of the side bars 18. Then when it is desired to lower the carrying bars 23 the screws 29 have to be turned in the opposite direction so as to move the nuts 28 with the side pins 32 and connecting links 27 and the carrying bars 23 forwardly and turn the toggle links from the positions shown in Fig. 10 to the lowest positions shown in Fig. 8 when the carrying bars 23 will rest upon the lower side bars 18. Each of these lower side bars 18 of the carriage is preferably formed of two flat section side bars (see Figs. 11 and 12) which form the sides of the trough and these are riveted as by rivets 34 (Fig. 10) to intermediate flat section bars forming the bottom of the trough and arranged at intervals apart to form gaps for the rollers 20 of the carriage which are arranged in the trough between the sides of the same and are there secured by axle pins 19 which pass through the rollers 20 the lower portions of which latter project through the gaps in the bottom of the trough to run along the tops of the side girders 2 of the cross frame. The rising and falling inverted trough section goods carrying bars 23 are preferably also similarly formed of two flat section side bars fixed at the same distance apart as are the side bars of the lower trough section bars 18 and similarly fixed as by rivets 35 to an intermediate flat section bar forming the top of the trough see Figs. 10, 11, 12. Fixed on the outer part of each of the screws 29 there is a spur wheel 36 which through intermediate idle spur wheels 37, 38, is driven by a spur pinion 39, the boss 40 of which is mounted to turn in horizontal bearings 41 of the tie bracket 22 through bosses 42 of which pass the stationary axle pins 43, 44, of the spur wheels 37, 38. This bracket 22 is preferably made in halves as shown, the division being at 69 (Fig. 8) in plane parallel to the plane of the wheels so as to enable said wheels to be readily got into position between the halves of the bracket. The driving spur pinion 39 is made with a square hole 45 so as to slide easily along the square shaft 46 which passes through this pinion and runs longitudinally from end to end of the carriage along the center of the same and at its end is mounted to turn in bearings 71, 48, of brackets fixed on the cross end girders 49, 50, arranged immediately underneath the longitudinal side girders 2 of the carriage D and to which these side girders are riveted or otherwise fixed. On the back end of the square shaft 46 there is a hand wheel 47 for turning the same to turn the screws 29 and operate the rising and falling side bars of the goods carriage D as aforesaid. The travelling of the goods carriage D along the side girders 2 of the frame is preferably effected by means of two endless chains 52, 53, which are connected to the cross bracket 22 of the carriage and pass around the driving toothed chain wheels 54 which are mounted on the horizontal cross shaft 55 at the back end of the frame. Said chains 52, 53, are arranged parallel with one another and parallel with the side girders 2 of the cross frame and at the front end of the frame pass over guide rollers 56, 57, and back to the underside of the toothed chain wheels 54. Means such as the hand wheel 56 are provided on the shaft 55 for turning the same so as thereby to move the goods carriage D along the side girders 2 in the one or the other direction. The outer end of the shaft 55 is carried in a bearing 57 of a bracket 58 fixed on the extension of the cross girder 50 (see Fig. 2). There are two guide pulleys 59 arranged underneath the chains 52, 53, and carried by screws 60 in brackets 61 with nuts (not shown on the drawings) by which the pulleys 59 can be moved up or down to take up any slack in the chains. These pulleys 59 are situated between the gear chain pulleys 54 and two guide pulleys 62 arranged above the lower portions of the chains and carried by bearings 63 from one of the cross girders 1 (see Figs. 1 and 2).

When the furnace is constructed for the goods to be delivered on to the floor of the furnace then in said floor there must be built two vertical parallel channels such as 64 (Fig. 13) running from the front to the back of the furnace with rails 15 at the bottom of the channels which are arranged at the proper distance apart to accommodate the side bars of the carriage D. Or when applying our invention to an existing annealing furnace, then, so as to avoid interfering with the floor of such furnace, the rails in the furnace along which the rollers 20 of the goods carriage travel can be arranged on the furnace floor as shown in Fig. 14, where said rails are marked 65 and they are made all along with upstanding side plates 66 carried to the proper height to receive the goods, such as the bars or tubes 63, from the carriage as aforesaid. The side plates 66 of the rails must be arranged at the proper distance apart to allow the side bars 18, 23, of the carriage D to enter between them.

In operation the short bars, tubes or other goods to be passed into the furnace C are placed crosswise on the rising and falling carrying bars 23 of the carriage D (or if the goods are too small to be so placed then they are placed on cross bearers on the said carrying bars 23) and the carrying bars 23 are then raised as aforesaid by turning the hand wheel 47 and screws 29 so as to travel the nuts 28 backwardly. After the traveller A has been placed in the right position immediately opposite the furnace with the girders 2 forming the rails for the carriage immediately opposite the rails 15 in the furnace, the hand wheel 56 is turned so as by the endless chains 52, 53, to move the goods carriage D with the goods forward, that is towards the right hand in Figs. 1 and 2 into the furnace. When the carriage D with the goods thereon has been travelled into the furnace and along the rails 15 of the same and arrives at the end of its journey the screws 29 are by the hand wheel 47 turned in the opposite direction so as to travel the nuts 28 forward and to lower the goods travelling bars 23 on to the bars 18 of the carriage and now they will be clear of the goods (say the bars 63 indicated by the dotted lines in Fig. 13) which will be left on the floor of the furnace C and the goods carrying carriage D will then by turning the hand wheel 56 be moved back out of the furnace. Similarly when removing the goods (such as the bars 63 Fig. 13) from the furnace, the goods carriage D with the goods carrying bars 23 in their lowest position is by turning the hand wheel 56 moved forward along the side girders 2 and into the furnace underneath the bars or tubes 63 or other goods and then by turning the hand wheel 47 and screws 29 the carrying bars 23 are raised underneath the bars or tubes 63 or other goods which have been annealed and which are now lifted by and with the carrying bars 23 up above the floor 14 and can now be withdrawn with the carriage D out of the furnace and the traveller A with the goods carriage D thereon and the goods carried thereby can be travelled along the rails B outside the furnace to any desired destination.

In Figs. 1 and 2 the goods carriage D is shown as partly entering the furnace C but it will be understood that when withdrawn to its full backward position, that is towards the left hand in Figs. 1 and 2, the front end of the goods carriage will be clear of the furnace.

Alternative means for raising and lowering the goods carrying bars 23 of the carriage D may conveniently consist of two series of pairs of inclined wedge like blocks see Fig. 3 one series of these blocks 67 being fixed to the bottom of the lower channel bars 18 and the inclined blocks 68 forming the upper series being fixed in the inverted channel bars 23 so as to rest upon the inclined blocks 67. These inclined wedge like blocks are arranged between the rollers 20 of the carriage D and it will be seen that they have the effect of causing the goods carrying bars 23 to be lowered by the screws 29 when said screws are turned in one direction and the goods carrying bars will be raised when said screws are turned in the opposite direction.

The accompanying drawings illustrate what I consider to be the best way of carrying my invention into practice, but it is to be understood that my invention is not limited to the precise details shown as these may be varied to some extent without departing from the nature of my invention.

What I claim as my invention and desire to secure by Letters Patent is:—

1. Apparatus for charging or discharging furnaces comprising, a traveller adapted to move transversely, a cross frame carried by said traveller having rails, a goods carrying carriage mounted on said cross frame and adapted to move on said rails, longitudinally disposed goods-carrying bars movably mounted above said carriage and adapted to carry the goods into or remove them from the furnace, means for raising and lowering said bars on said goods carriage, and means for moving said carriage longitudinally to carry the goods bodily into the furnace.

2. Apparatus for charging or discharging furnaces comprising a goods-carrying carriage, a traveller adapted to move the carriage transversely, a cross frame carried by said traveller having rails for the goods carriage, longitudinally disposed goods carrying bars on said carriage adapted to carry the goods into or remove them from the furnace, means for raising and lowering said bars on said goods carriage, and means carried by said cross frame adapted to move said goods carriage along the rails on the cross frame to carry the goods bodily into the furnace.

3. Apparatus for charging or discharging furnaces comprising a goods-carrying carriage, means for travelling said carriage transversely, longitudinally disposed goods-carrying bars on said carriage adapted to carry the goods into or remove them from the furnace, means for moving said bars longitudinally relative to said carriage, means for supporting the bars so that such relative movement serves to raise or lower the bars, and means for moving said carriage longitudinally to carry the goods bodily into the furnace.

4. Apparatus for charging or discharging furnaces comprising a goods-carrying carriage, a traveller adapted to move the carriage transversely, a cross frame carried by said traveller having rails for the goods carriage, longitudinally disposed goods-carrying bars on said carriage adapted to carry the goods into or remove them from the furnace, means for moving said bars longitudinally relative to said carriage, means for supporting the bars so that such relative movement serves to raise or lower the bars, and means carried by said cross frame adapted to move said goods carriage along the rails on the cross frame to carry the goods bodily into the furnace.

5. Apparatus for charging or discharging furnaces comprising a goods-carrying carriage, means for travelling said carriage transversely, longitudinally disposed goods-carrying bars on said carriage adapted to carry the goods into or remove them from the furnace, means for moving said bars longitudinally relative to said carriage, a plurality of supporting members pivotally associated with the carriage and with the bars whereby the relative movement serves to raise or lower the bars, and means for moving said carriage longitudinally to carry the goods bodily into the furnace.

6. Apparatus for charging or discharging furnaces comprising a goods-carrying carriage, a traveller adapted to move the carriage transversely, a cross frame carried by said traveller having rails for the goods carriage, longitudinally disposed goods-carrying bars on said carriage adapted to carry the goods into or remove them from the furnace, means for moving said bars longitudinally relative to said carriage, a plurality of supporting members pivotally associated with the carriage and with the bars whereby the relative movement serves to raise or lower the bars, and means carried by said cross frame adapted to move said goods carriage along the rails on the cross frame to carry the goods bodily into the furnace.

7. Apparatus for charging or discharging furnaces comprising a goods-carrying carriage, means for travelling said carriage transversely, means for adjusting the height of said goods carriage, longitudinally disposed goods-carrying bars on said carriage adapted to carry the goods into or remove them from the furnace, means for raising and lowering said bars on said goods carriage, and means for moving said carriage longitudinally to carry the goods bodily into the furnace.

8. Apparatus for charging or discharging furnaces comprising a goods-carrying carriage, a traveller adapted to move the carriage transversely, a cross frame carried by said traveller having rails for the goods carriage, means for adjusting the height of said rails to raise or lower the goods carriage, longitudinally disposed goods-carrying bars on said carriage adapted to carry the goods into or remove them from the furnace, means for moving said bars longitudinally relative to said carriage, means for supporting the bars so that such relative movement serves to raise or lower the bars, and means carried by said cross frame adapted to move said goods carriage along the rails on the cross frame to carry the goods bodily into the furnace.

9. Apparatus for charging or discharging furnaces comprising a goods-carrying carriage, a traveller adapted to move the carriage transversely, a cross frame carried by said traveller having rails for the goods carriage, levelling screws adapted to adjust the height of the said rails and thereby raise or lower the goods carriage, nuts for operating said screws, longitudinally disposed goods-carrying bars on said carriage adapted to carry the goods into or remove them from the furnace, means for moving said bars longitudinally relative to said carriage, means for supporting the bars so that such relative movement serves to raise or lower the bars, and means carried by said cross frame adapted to move said goods carriage along the rails on the cross frame to carry the goods bodily into the furnace.

10. Apparatus for charging or discharging furnaces comprising a goods-carrying carriage, a traveller adapted to move the carriage transversely, a cross frame carried by said traveller having rails for the goods carriage, levelling screws adapted to adjust the height of the said rails and thereby raise or lower the goods carriage, nuts for operating said screws, longitudinally disposed goods-carrying bars on said carriage adapted to carry the goods into or remove them from the furnace, means for moving said bars longitudinally relative to said carriage, a plurality of supporting members pivotally associated with the carriage and with the bars whereby the relative movement serves to raise or lower the bars, and means carried by said cross frame adapted to move said goods carriage along the rails on the cross frame to carry the goods bodily into the furnace.

In testimony whereof I have signed my name to this specification.

MARTIN VAN MARLE.